(12) United States Patent
Sutskover

(10) Patent No.: US 8,004,610 B2
(45) Date of Patent: Aug. 23, 2011

(54) TECHNIQUES TO ENABLE DIGITAL TELEVISION AND GPS COEXISTENCE

(75) Inventor: Ilan Sutskover, Hadera (IL)

(73) Assignee: Intel Corporation, Santa Clara, CA (US)

( * ) Notice: Subject to any disclaimer, the term of this patent is extended or adjusted under 35 U.S.C. 154(b) by 1281 days.

(21) Appl. No.: 11/642,316

(22) Filed: Dec. 19, 2006

(65) Prior Publication Data

US 2008/0143886 A1 Jun. 19, 2008

(51) Int. Cl.
*H04N 11/00* (2006.01)
*H04N 5/44* (2006.01)
*H04N 5/268* (2006.01)
*H04N 5/50* (2006.01)

(52) U.S. Cl. ......... 348/552; 348/731; 348/725; 348/705

(58) Field of Classification Search .................. 348/731, 348/706, 705, 552, 838, 725, 558, 730, 14.04, 348/553, 554; 701/36; 455/556.1, 556.2
See application file for complete search history.

(56) References Cited

U.S. PATENT DOCUMENTS

| | | | | |
|---|---|---|---|---|
| 5,825,408 A * | 10/1998 | Yuyama et al. | ............ | 348/14.01 |
| 6,317,162 B1 * | 11/2001 | Matsumoto | ................... | 348/553 |
| 6,341,327 B1 * | 1/2002 | Sager | ............................ | 711/108 |
| 6,801,261 B1 * | 10/2004 | Haynes | ......................... | 348/553 |
| 2002/0116077 A1 * | 8/2002 | Kunimoto | ......................... | 700/9 |
| 2003/0145328 A1 * | 7/2003 | Rabinowitz et al. | ............. | 725/72 |
| 2004/0056954 A1 * | 3/2004 | Crandall et al. | ............... | 348/148 |
| 2005/0030229 A1 * | 2/2005 | Spilker, Jr. | ..................... | 342/385 |
| 2005/0151882 A1 * | 7/2005 | Donato | ......................... | 348/553 |
| 2006/0195239 A1 * | 8/2006 | Teichner et al. | ................ | 701/36 |
| 2007/0042813 A1 * | 2/2007 | Ito | ................................. | 455/573 |
| 2007/0116427 A1 * | 5/2007 | Youn | ............................... | 386/83 |
| 2009/0310030 A1 * | 12/2009 | Litwin et al. | ................. | 348/731 |

FOREIGN PATENT DOCUMENTS

| | | |
|---|---|---|
| EP | 1659699 A2 | 5/2006 |
| EP | 1694062 A1 | 8/2006 |
| KR | 102005041366 A | 5/2005 |
| KR | 100631636 B1 | 9/2006 |

OTHER PUBLICATIONS

International Search Report and Written Opinion for PCT/US2007/084328 mailed Apr. 21, 2008, 11 pages.
International Preliminary Report on Patentability received for PCT Patent Application No. PCT/US2007/084328, mailed on Jul. 2, 2009. pp. 7.

* cited by examiner

*Primary Examiner* — Victor Kostak
(74) *Attorney, Agent, or Firm* — James S. Finn

(57) ABSTRACT

An embodiment of the present invention provides an apparatus, comprising a digital television (DTV) receiver including at least a one-bit-flag such that when the flag is "on", the DTV receiver is not allowed to start an initial acquisition process, and at least one additional receiver sharing part of a receive chain of the DTV receiver and wherein the additional receiver is capable of turning the one-bit-flag "on". The flag may be set through communication between the drivers of the DTV receiver and the at least one additional receiver.

16 Claims, 2 Drawing Sheets

TECHNIQUES TO ENABLE DIGITAL TELEVISION AND GPS COEXISTENCE

BACKGROUND

Digital television (DTV) is an emerging market today. Deployment of terrestrial broadcasting began during 2005 and the market is currently moving toward handheld-oriented broadcast services that can withstand mobility of the receivers. DVB-H and T-DMB are going to be widely deployed for mobile TV, whereas DVB-T is already widely deployed for nomadic-to-portable reception conditions.

Time slicing is a technology uniquely employed by DVB-H. It allows the transmission to occur in time slots. The main objective of this feature is power saving at the receiver. However, all other standards (DVB-T, T-DMB, ISDB-T) do not have this mechanism and they rely on continuous reception conditions.

GPS is by now a well known technology that is widely exercised by handheld/PDA devices. GPS is essentially supported in two modes: assisted and non-assisted. In assisted mode, the receiver gets the sky maps from source network (e.g., a cellular operator) and these maps together with measurements of timing and Doppler calculations allow the receiver to determine precise location of the receiver. In non-assisted mode, the receiver has also to decode the sky maps from the satellite transmissions. The non-assisted mode requires mostly reception in bursts that length around 1 minute or so. The assisted mode requires reception of some hundreds of milliseconds, but only partially continuous. In any case, the GPS receiver will need few milliseconds at least every now and awhile to perform reception.

A problem arises when the two subsystems share the radio/antennae such that when one subsystem is operational the other one cannot perform reception.

Thus, a strong need exists for techniques to enable digital television and GPS coexistence.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may be best understood by reference to the following detailed description when read with the accompanying drawings in which:

Figure 1:
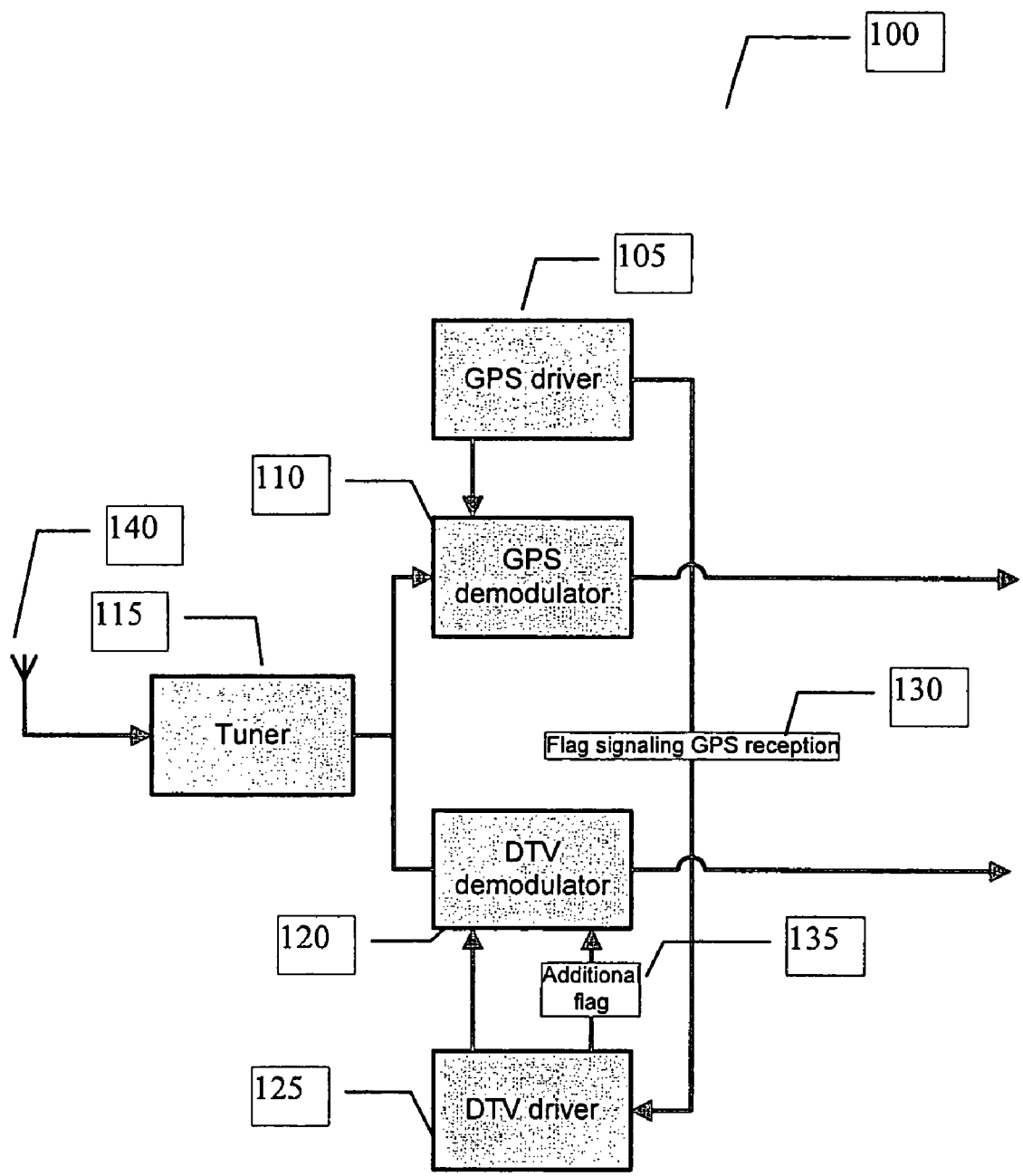
FIG. 1 illustrates an apparatus and system of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11 h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

As alluded to above, currently, when GPS and DTV share the same radio (same antenna or same receiver chain or same local oscillator etc.), the DTV reception may not be of good quality if the GPS has to operate periodically at its normal time constants, since the DTV will go for an initial acquisition process (that may take a long time and "freezes" the picture) every time this happens.

In an embodiment of the present invention, with the proposed architecture, the cut in the DTV output shall last several orders of magnitude less than the current situation—a few milliseconds instead of few seconds. This will allow high quality user perceived concurrency.

Without some embodiments of the present invention, with GPS incorporated, it is likely that a serious damage to DTV viewing quality will occur. With embodiments of the present invention, it is possible to avoid this quality degradation.

It is understood that although some embodiments of the present invention are illustrated using a global positioning system (GPS), the present invention is valid for any other technology in which resources are shared with digital TV and for which the DTV reception is deferred only for short enough periods and not-frequent enough periods.

To understand the problem solved by the present invention, it is beneficial to look at the numbers. DVB-T has blocks lasting between 200 us to 1.8 ms; T-DMB has blocks lasting between 170 us to 1.3 ms etc. GPS (periodically) requires few milliseconds of receptions. Therefore, deferring the receive chain in favor of GPS results in DTV losing at least several blocks. It is likely that in this case the DTV receiver will declare "loss of signal" and will start an initial acquisition stage. The initial acquisition stage for systems like DVB-T can last a few seconds (~5 sec) because it requires the receiver to lock on a new frequency and find the television channel of interest. The problem worsens when the acquisition starts examining frequencies other than the one the receiver is already locked on. If the initial acquisition stage is performed, and a 5 msec break in reception occurs, then the user will perceive a picture freeze or a blank screen. Of course, if this situation happens periodically then DTV reception quality will be dramatically impacted, meaning that GPS and DTV cannot be operated "concurrently" practically.

DTV receivers may include mechanisms that allow them to keep synchronization if the signal is lost for short durations; however they start re-acquisition even for rather short interruptions because they cannot distinguish between deliberate temporary loss and non-deliberate loss of reception. In some embodiments of the present invention, it is assumed that the loss of signal period due to GPS (or other 'concurrent' application sharing the receive chain) is short, but not short enough to avoid starting re-acquisition.

Turning now to the Figures, FIG. 1, shown generally as 100, provides a proposed architecture according to one embodiment of the present invention. Note that the instruction to the DTV driver can be obtained also from a "higher-layer-driver" if such exists. An embodiment of the present invention provides the inclusion of a one-bit-flag 135 at the DTV MAC layer such that when this flag is "on", the DTV receiver is not allowed to start an initial acquisition process. The DTV driver 125, fed by the GPS driver 105, is the one responsible for turning this flag to "on" mode, via flag signaling GPS reception 130, when GPS acquisition is performed and to "off" when GPS finishes its acquisition process (or some short time after that). Thus, the DTV receiver will have a chance to receive the signal back again on the same channel and the entire break in streaming should last a few milliseconds instead of few seconds. In this case, it is expected that advanced video decoders will be able to render the video stream perceived as error-free. GPS demodulator 110 and DTV demodulator 120 are fed by GPS driver 105 and DTV driver 105 respectively. Connected to GPS demodulator 110 and DTV demodulator 120 may be tuner 115 further connected to antenna 140.

Figure 2:
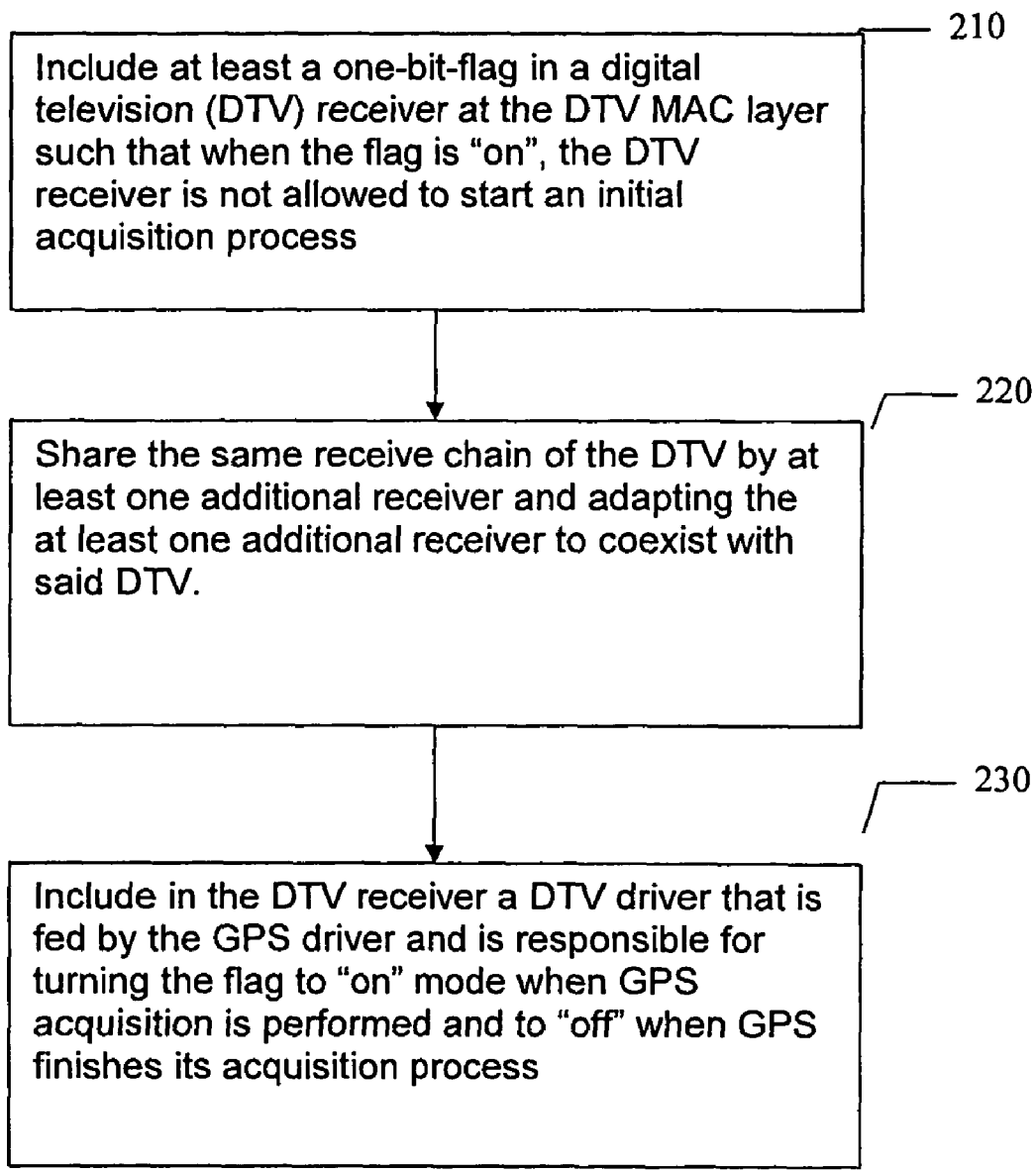
FIG. 2 is a flowchart of the method of an embodiment of the present invention.

Looking now at the flowchart of FIG. 2, is yet another embodiment of the present invention and provides a method, comprising including at least a one-bit-flag in a digital television (DTV) receiver at the DTV MAC layer such that when the flag is "on", the DTV receiver is not allowed to start an initial acquisition process 210. Subsequently, at 220 the present method may further comprise sharing the same receive chain of the DTV by at least one additional receiver and adapting the at least one additional receiver to coexist with the DTV. The at least one additional receiver may be a GPS receiver and the present method may still further comprise including in the DTV receiver a DTV driver that is fed by the GPS driver and is responsible for turning the flag to "on" mode when GPS reception is performed and to "off" when said GPS reception is powered down 230.

Some embodiments of the present invention may be implemented, for example, using a machine-readable medium or article which may store an instruction or a set of instructions that, if executed by a machine, for example, by the system of FIG. 1, by the receiver in connection with a processor (not shown), or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

In an embodiment of the present invention the machine-accessible medium that provides instructions, which when accessed, may cause the machine to perform operations comprising including at least a one-bit-flag in a digital television (DTV) receiver at the DTV MAC layer such that when the flag is "on", the DTV receiver is not allowed to start an initial acquisition process.

The machine-accessible medium may further comprise the instructions causing the machine to perform operations further comprising sharing the same receive chain of the DTV by at least one additional receiver and adapting the at least one additional receiver to coexist with the DTV; and yet may still further comprise the instructions causing the machine to perform operations further comprising including in the DTV receiver a DTV driver that is fed by the GPS driver and is responsible for turning the flag to "on" mode when GPS acquisition is performed and to "off" when GPS finishes its acquisition process.

Some embodiments of the present invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

I claim:

1. An apparatus, comprising:
   a digital television (DTV) receiver including at least a one-bit-flag such that when said flag is "on", the DTV receiver is not allowed to start an initial acquisition process;
   at least one additional receiver sharing part of a receive chain of said DTV receiver and wherein said additional receiver is capable of turning said one-bit-flag "on"; and
   wherein said at least one additional receiver is a GPS receiver and wherein said DTV driver is fed by a GPS driver and is responsible for turning said flag to "on" mode when GPS reception is performed and to "off" when said GPS reception is powered down.

2. The apparatus of claim 1, wherein said flag is set through communication between the drivers of said DTV receiver and said at least one additional receiver.

3. The apparatus of claim 2, further comprising a video decoder adapted to render the video stream of said DTV to be perceived as error-free.

4. The apparatus of claim 2, wherein said one-bitg-flag communication between said DTV receiver and said at least one additional receiver is conducted through a third driver or controller.

5. A method, comprising:
   including at least one-bit-flag in a digital television (DTV) receiver such that when said flag is "on", the DTV receiver is not allowed to start an initial acquisition process;
   sharing part of a receive chain of said DTV receiver by at least one additional receiver and wherein said additional receiver is capable of turning said one-bit-flag "on"; and
   wherein said at least one additional receiver is a GPS receiver and wherein said DTV driver is fed by a GPS driver and is responsible for turning said flag to "on" mode when GPS reception is performed and to "off" when said GPS reception is powered down.

6. The method of claim 5, further comprising setting said flag through communication between the drivers of said DTV receiver and said at least one additional receiver.

7. The method of claim 6, further comprising using a video decoder to render the video stream of said DTV to be perceived as error-free.

8. The method of claim 6, further comprising conducting said one-big-flag communication between said DTV receiver and said at least one additional receiver through a third driver or controller.

9. A machine-accessible medium that provides instructions, which when accessed, cause a machine to perform operations comprising:
   including at least one-bit-flag in a digital television (DTV) receiver such that when said flag is "on", the DTV receiver is not allowed to start an initial acquisition process;
   sharing part of a receive chain of said DTV receiver by at least one additional receiver and wherein said additional receiver is capable of turning said one-bit-flag "on"; and
   wherein said at least one additional receiver is a GPS receiver and wherein said DTV driver is fed by a GPS driver and is responsible for turning said flag to "on" mode when GPS reception is performed and to "off" when said GPS reception is powered down.

10. The machine-accessible medium of claim 9, further comprising said instructions causing said machine to perform operations further comprising setting said flag through communication between the drivers of said DTV receiver and said at least one additional receiver.

11. The machine-accessible medium of claim 10, further comprising said instructions causing said machine to perform operations further comprising using a video decoder to render the video stream of said DTV to be perceived as error-free.

12. The machine-accessible medium of claim 10, further comprising said instructions causing said machine to perform operations further comprising conducting said one-bitg-flag communication between said DTV receiver and said at least one additional receiver through a third driver or controller.

13. The machine-accessible medium of claim 9, wherein said at least one additional receiver is a GPS receiver and wherein said DTV driver is fed by a GPS driver and is responsible for turning said flag to "on" mode when GPS acquisition is performed and to "off" when said GPS finishes its acquisition process.

14. A system, comprising:
   a GPS receiver;
   a digital television receiver (DTV) operable on the same receive chain as said GPS receiver and including at least a one-bit-flag at the DTV MAC layer such that when this flag is "on", the DTV receiver is not allowed to start an initial acquisition process thereby allowing said DTV and GPS receiver to coexist; and
   wherein said DTV receiver includes a DTV driver, fed by the GPS driver and is responsible for turning this flag to "on" mode when GPS reception is performed and to "off" when said GPS reception is powered down.

15. The system of claim 14, further comprising a video decoder adapted to render the video stream of said DTV to be perceived as error-free.

16. The system of claim 14, wherein said one-big-flag communication between said DTV receiver and said at least one additional receiver is conducted through a third driver or controller.

* * * * *